United States Patent [19]

Briggs et al.

[11] Patent Number: 5,222,243
[45] Date of Patent: Jun. 22, 1993

[54] SORTING APPARATUS HAVING PLURALITY OF REGISTERS WITH ASSOCIATED MULTIPLEXERS AND COMPARATORS FOR CONCURRENTLY SORTING AND STORING INCOMING DATA ACCORDING TO MAGNITUDE

[75] Inventors: Randall D. Briggs; Erin A. Handgen, both of Fort Collins, Colo.

[73] Assignee: Hewlett-Packard Company, Palo Alto, Calif.

[21] Appl. No.: 478,126

[22] Filed: Feb. 9, 1990

[51] Int. Cl.$^5$ .................................. G06F 7/06
[52] U.S. Cl. .......................... 395/800; 364/259.2; 364/947.2; 364/948.1; 364/948.3; 364/DIG. 2; 364/146.2
[58] Field of Search .................. 395/800; 340/146.2

[56] References Cited

U.S. PATENT DOCUMENTS

| | | | |
|---|---|---|---|
| 3,931,612 | 1/1976 | Stevens et al. | 340/172.5 |
| 4,559,612 | 12/1985 | Vrielink | 364/900 |
| 4,567,572 | 1/1986 | Morris et al. | 364/900 |
| 4,570,221 | 2/1986 | Martens | 364/200 |
| 4,628,483 | 12/1986 | Nelson | 364/900 |
| 4,651,301 | 3/1987 | Ballmer et al. | 364/900 |
| 4,833,655 | 5/1989 | Wolf et al. | 371/51.5 X |
| 4,914,625 | 4/1990 | Billian | 371/11.2 X |
| 4,958,141 | 9/1990 | Englesman | 364/715.01 X |
| 4,991,134 | 2/1991 | Ivsin | 364/900 |

FOREIGN PATENT DOCUMENTS 59-229643 12/1984 Japan .

OTHER PUBLICATIONS

Segal, Moshe "Hardware Sorting Chip Steps Up Software Pace", Electronic Design, Jun. 26, 1986, pp. 85-91.

Loomis, M. E. S., "Data Management and File Processing", copyright 1983, ISBN:0-13-196477-1, p. 53.

Primary Examiner—Thomas C. Lee
Attorney, Agent, or Firm—Guy J. Kelley

[57] ABSTRACT

Apparatus for receiving and automatically storing data words according to magnitude is provided. A self-sorting stack embodying the invention comprises a sorting device comprising means for simultaneously comparing the incoming data with the contents of each stack register, and logic and switching means for automatically inserting the new data into the correct register on the stack while at the same time pushing the contents of that and subsequent registers down one location. The entire operation is performed in one clock cycle, the same as for a conventional nonsorting stack.

3 Claims, 13 Drawing Sheets

FIG. 2

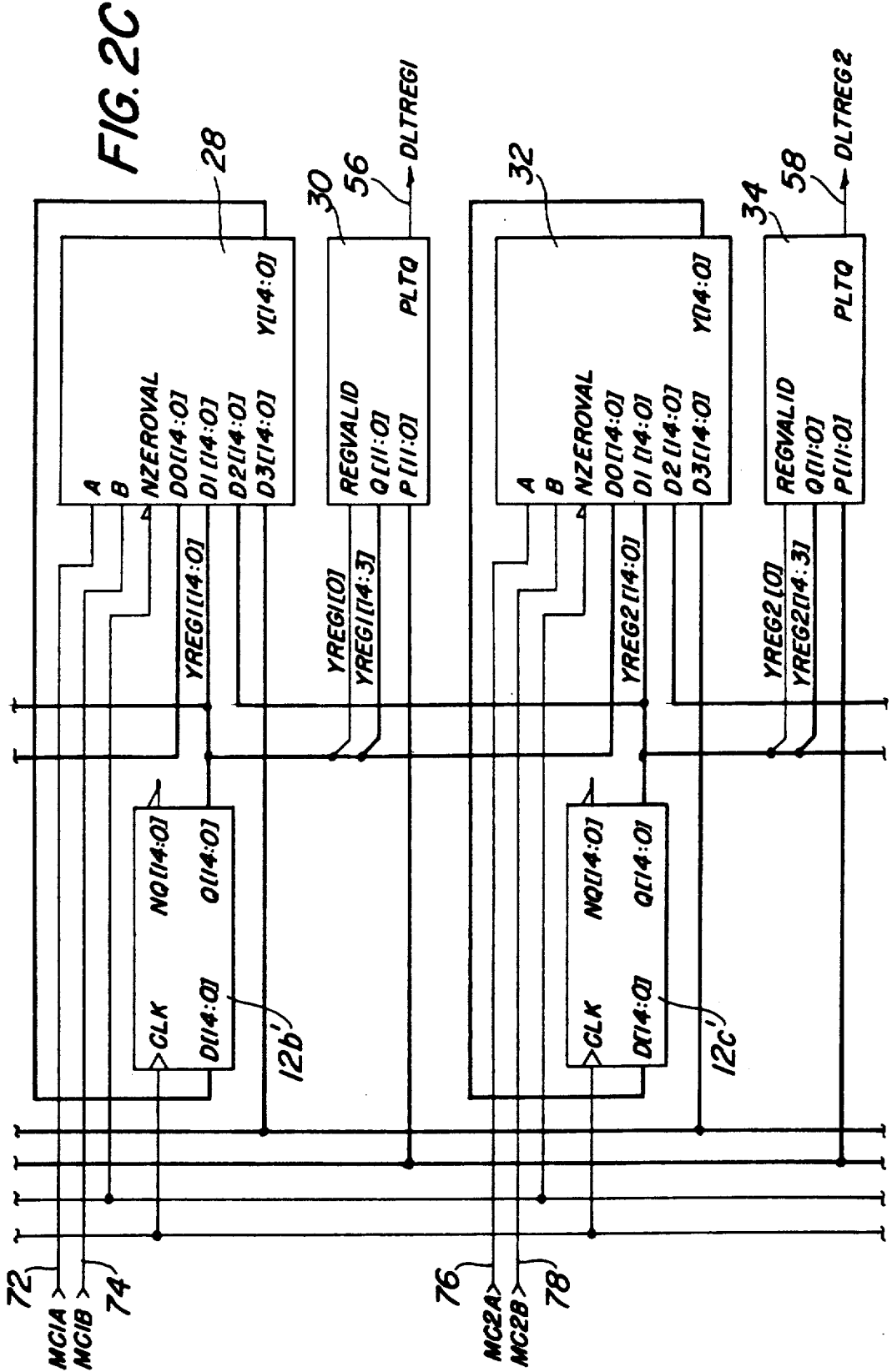

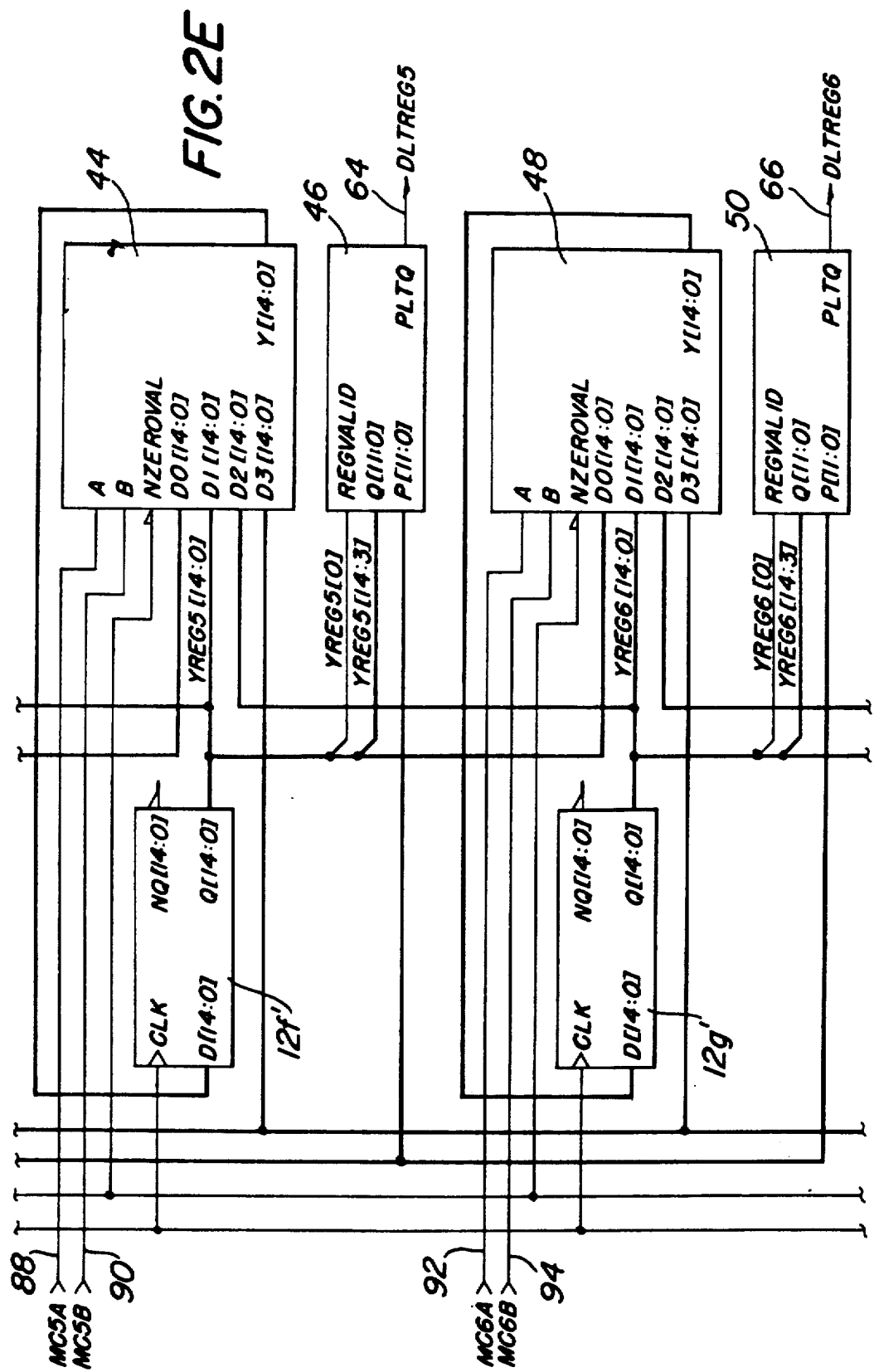

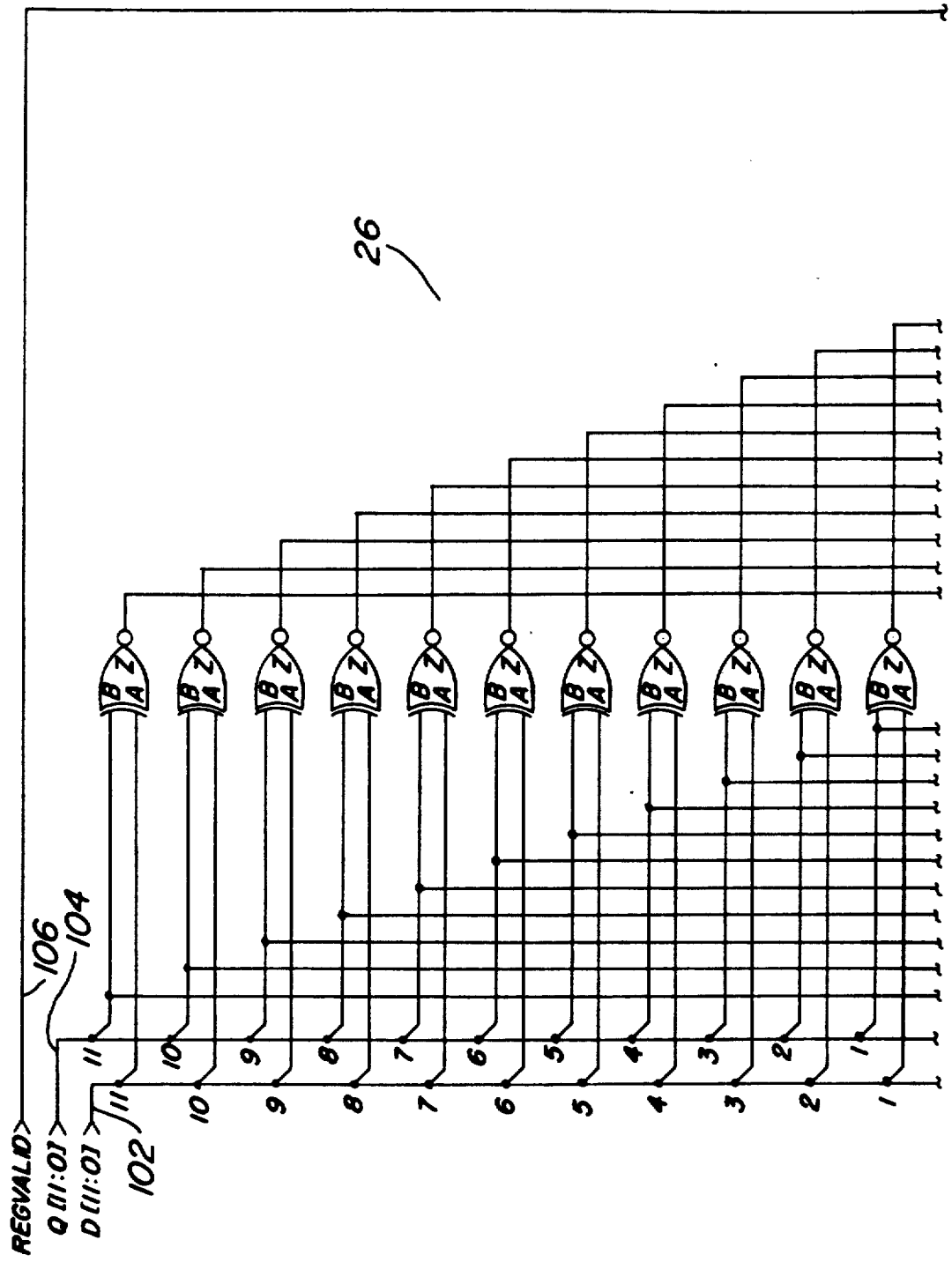

5,222,243

SORTING APPARATUS HAVING PLURALITY OF REGISTERS WITH ASSOCIATED MULTIPLEXERS AND COMPARATORS FOR CONCURRENTLY SORTING AND STORING INCOMING DATA ACCORDING TO MAGNITUDE

FIELD OF THE INVENTION

The present invention relates generally to the field of computer memory and storage devices More particularly, the present invention is directed to a self-sorting storage device that automatically inserts incoming data words between words of lesser and greater magnitude in a manner that stores the data in rank order.

BACKGROUND OF THE INVENTION

Many computer systems have a dedicated area of memory known as a "stack", or "pushdown stack", which is particularly useful for quickly storing and retrieving data. Data is generally written to and read from the stack with simple one-word statements. For example, "PUSH A" is a typical command for loading the contents of Register "A" onto the stack. Similarly, "POP A" would result in the data word located at the top of the stack being loaded into Register A. Stack data can generally be accessed faster, e.g., in a single clock cycle, than data stored in other areas of memory. A disadvantage of storing data in a stack, as opposed to other areas of memory, is that data can only be retrieved from the stack on only either a first-in-first-out (FIFO) or a last-in-first-out (LIFO) basis. This is because the contents of the stack registers are pushed down (i.e., each data word is shifted down to the next register in the stack) ever time a new data word is written to the stack, and data located down in the stack can only be accessed either after it is "pushed" out the bottom (FIFO) or after it is or "popped" out the top (LIFO).

Devices for sorting data are known. See for example U.S. Pat. Nos. 3,931,612, 4,651,301, 4,570,221 and 4,559,612. There are times at which it is desirable that data words be sorted and stored in a particular order, such as, for example, on the basis of their magnitudes. In the prior art, data to be stored in a stack is either ranked, or sorted, prior to being loaded into the stack, or it is sorted after all the data words are retrieved from the stack. These sorting operations are costly in terms of the extra memory required for temporarily storing the words to be sorted, and in terms of the time required to perform the sorting operation. This latter cost is particularly undesirable because it defeats one goal of utilizing the stack in the first place i.e., to minimize the time involved in storing and retrieving data.

Thus, it is desirable to provide a device whereby data words are automatically sorted and stored in rank order in a stack-like sequence of registers. Preferrably the data would be automatically maintained in rank order as new words are added to the stack. It is also desirable to provide a device for automatically storing data in rank order in any type of storage device, whether it be a stack, RAM, bubble memory, etc. The present invention achieves these objectives.

SUMMARY OF THE INVENTION

According to the invention, apparatus for sorting and storing incoming data words according to their magnitudes ("rank order") comprise: means, such as a sequence of registers, for storing a sequence of data words; and sorting means coupled to the registers for receiving incoming data words and loading them into the registers in rank order in accordance with their magnitudes.

In one particular embodiment of the invention, the stored data words are maintained in sequential locations (or registers, if a stack of registers is used) with lesser values preceding greater values. Alternatively, the stored data words are maintained in sequential locations with greater values preceding lesser values.

In the most preferred embodiment, the means for storing the data words comprises a stack of a fixed number (e.g. eight) of registers. Most preferably the sorting means comprises means for comparing the magnitude of at least one stored data word with the magnitude of the incoming data word, and for providing an output signal indicative of whether the incoming data word is less than the stored data word. The most preferred embodiment further comprises control means, coupled to the comparator and sorting means, for providing a control signal to the sorting means; and means (such as a plurality of multiplexers) responsive to the control signal, for storing the incoming data word in the sequence in rank order. Derivation of the control signal is dependent upon the comparator output signals and an externally generated mode signal.

BRIEF DESCRIPTION OF THE DRAWINGS

FIGS. 2A–2F are a detailed schematic diagram of a self-sorting stack embodying the present invention.

FIGS. 3A–3E are a schematic diagram of a preferred comparator circuit for use in the self-sorting stack of FIG. 2.

DETAILED DESCRIPTION OF PREFERRED EMBODIMENTS OF THE INVENTION

The invention broadly comprises means for receiving incoming data words and storing the incoming words in rank order according to their magnitudes. The means for storing the data preferably comprises data registers, but may also include other types of storage devices, for example, RAM, bubble memory, etc. It is the means and method by which the data is automatically sorted that forms the basis of the instant invention.

The invention will now be described with reference to the drawings, wherein like numerals represent like elements.

Figure 1:
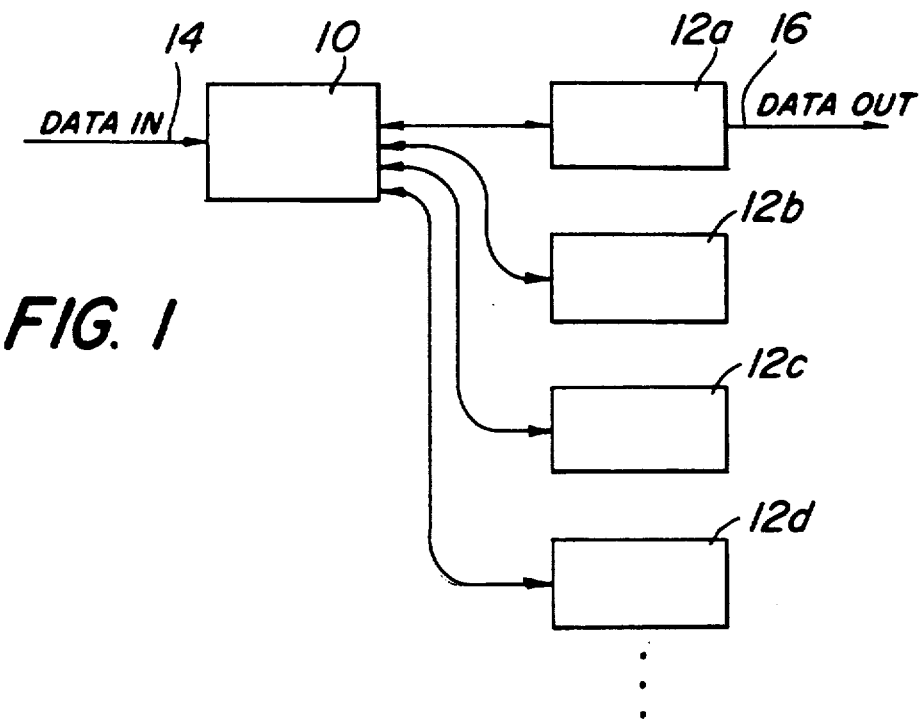
FIG. 1 is a simplified block diagram of a self-sorting storage device according to the present invention.

Referring to FIG. 1, there is illustrated a simplified block diagram of a sorting device according to the present invention. FIG. 1 is merely a broad representation of the invention. The sorting device comprises sorting means 10 for receiving incoming data words on a line 14 and outputting those words to a plurality of storage devices (e.g. registers) 12a, 12b, 12c, 12d etc. The precise number of storage devices depends upon the requirements of the user. Sorting means 10 is capable of accessing the storage devices in a parallel fashion so that an incoming data word can be stored within any register, depending upon the value, or magnitude, of the data word being stored. In this way, the stored data is maintained in rank order. (Note that the phrase "rank order" as employed herein designates increasing or decreasing order.) Output data on line 16 from the storage devices 12a, 12b, 12c, 12d etc. will be in either increasing or decreasing order, depending upon the precise embodiment of sorting means 10.

Specific circuitry embodying the invention will now be discussed. In the preferred embodiment described below, data is maintained in a "stack" of data registers in increasing order, although with a few obvious modifications the data may be maintained in decreasing order. A sorting device that sorts and stores the data in decreasing order is therefore contemplated as being within the scope of the invention.

Referring now to FIG. 2, there is shown a detailed implementation of the self sorting device of FIG. 1 according to one embodiment of the invention. The self-sorting stack illustrated in FIG. 2 comprises a plurality of fifteen bit wide four-to-one multiplexers 24, 28, 32, 36, 40, 44, 48, 52; a plurality of fifteen bit registers 12a', 12b', 12c', 12d', 12e', 12f', 12g', 12h'; and a plurality of twelve bit comparators 26, 30, 34, 38, 42, 46 and 50. Multiplexers 24, 28, 32, 36, 40, 44, 48, 52 are controlled by controller 110 (not shown in FIG. 2). Controller 110 is discussed below in connection with FIG. 4. Though the invention is described herein for sorting fifteen bit data words, it should be understood that this represents merely one implementation of the invention, and that the invention is not so limited.

Incoming data words are received on line 14'. Each data word comprises fifteen bits of digital data and is received by buffers 20 and 22. Buffer 20 receives all fifteen bits of the incoming words on line 14, and transmits the word to the "D3" input of multiplexers 24, 28, 32, etc. Buffer 22 receives twelve bits of the incoming word on line 14' and outputs these twelve bits to the "P" inputs of comparators 26, 30, 34, 38, 42, 46, 50. There is one multiplexer 24, 28, 32, 36, 40, 44, 48, 52 associated with each of the storage registers 12a', 12b', 12c', 12d', 12e', 12f', 12g', 12h' respectively; and there are four data input terminals, "D0", "D1", "D2" and "D3" respectively, for each multiplexer. The D3 inputs receive new data from buffer 20. The D2 inputs, except for the last multiplexer in the sequence 52, receive data from the register immediately below (e.g. D2 of multiplexer 24 receives data from register 12b'). The D1 inputs receive data from their associated registers (e.g. D1 of miltiplexer 24 receives data from register 12a'). The D0 input of each multiplexer, except for the first multiplexer in the sequence 24, receives data from the register immediately above (e.g. DO of multiplexer 28 receives data from register 12a'). The D0 input of multiplexer 24 and the D2 input of multiplexer 52 are grounded.

The basic function of each multiplexer 24, 28, 32 etc. is to control whether its associated register (i) receives new, or "incoming", data, (ii) receives data from the register immediately above or below it, or (3) remains unchanged. Control logic for controlling the multiplexers is contained in controller 110, which is described below with reference to FIGS. 4 and 5. Control lines for each multiplexer, designated 68, 70 for multiplexer 24; 72, 74, for multiplexer 28; etc., are coupled to controller 110. The controller 110 provides control signals to the "A" and "B" inputs of each multiplexer. The control logic is discussed below with reference to FIGS. 4 and 5.

Each comparator 26, 30, 34 etc. receives new data on its "P" input (or terminal), and data from its associated register on its "Q" input For example, referring to comparator 26, its P input is driven by buffer 22 over line 102, and its Q input is driven by its associated register 12a' over line 104. The output signal of each comparator, designated "PLTQ", is TRUE when the magnitude of P is less than the magnitude of Q, and false otherwise. The PLTQ signal of each comparator is input to controller 110 (FIG. 4) over lines 54, 56, 58, 60, etc. Each PLTQ signal is transmitted to a different input terminal, designated "CMPLT0", "CMPLT1", "CMPLT2" etc. respectively, of controller 110. Each comparator also has an input entitled "REGVALID" which receives bit zero of the data word stored in its associated register. Bit zero is the "valid bit" of the data, and, when zero, indicates that the associated register is empty. When the valid bit of a data word in a register is zero, or FALSE, then the output signal of its associated comparator is forced TRUE, which indicates to controller 110 that the incoming data is less in magnitude than the current contents of the register. By setting the comparator in this manner, the magnitude of an incoming data word is defined as being less than data words whose valid bit is FALSE, indicating an empty register. Empty registers are thus kept at the bottom of the stack.

Note that in the preferred embodiment disclosed herein, only twelve bits of the fifteen bit register data are used for magnitude comparison. Of the remaining three bits, one is the "valid bit" previously discussed, and the other two are not used for sorting because, in this particular implementation, they do not indicate magnitude.

Each of the multiplexers 24, 28, 32 etc. also has an input designated "NZEROVAL" When NZEROVAL of a particular multiplexer is FALSE, the "valid bit" of the data word in that multiplexer's associated register is forced FALSE, indicating that the associated register is empty. The NZEROVAL inputs are driven by reset circuitry 100. When actuated, reset circuitry 100 therefore clears bit zero of registers 12a', 12b', 12c', etc.

Data is retrieved from registers 12a', 12b', 12c' etc. via line 16'. Although drawn as a single conductor, line 16' preferrably comprises one conductor for each bit of the data word being retrieved. As the registers are unloaded, data words are taken from the first register in the sequence, i.e. 12a', and subsequent data words are "pushed up" in the stack. This operation is automatically performed by multiplexers 24, 28, 32 etc. under the direction of controller 110. To fully appreciate the operation of the preferred embodiment, one should have an understanding of the control logic. The controller and control logic are discussed with reference to FIGS. 4 and 5 below. This discussion, however, will be preceded by a very brief discussion of preferred circuitry for implementing comparators 26, 30, 34, 38, 42, 46 and 50.

Referring now to FIG. 3, therein is depicted preferred comparator circuitry for use in the self-sorting stack of FIG. 2. For clarity, the circuitry of FIG. 3 will be discussed with reference to comparator 26, although in fact the same circuitry is employed in all of the comparators.

As discussed above, the P, Q, and REGVALID inputs to comparator 26 are provided over lines 102, 104, and 106 respectively. The circuitry shown is a combinatorial logic circuit whereby comparisons are performed in parallel. Note that no comparison is made for the contents of the last register in the sequence, i.e. register 12h', since if the new data word is not less than the contents of any of the preceding registers, then by default it is stored in the last register. Since the function of the comparators is described above with reference to FIG. 2 and the circuitry shown in FIG. 3 employs basic digital circuit techniques, the manner in which the circuitry operates will be apparent to those skilled in the art. Further discussion of FIG. 3 is therefore unnecessary.

Figure 4:
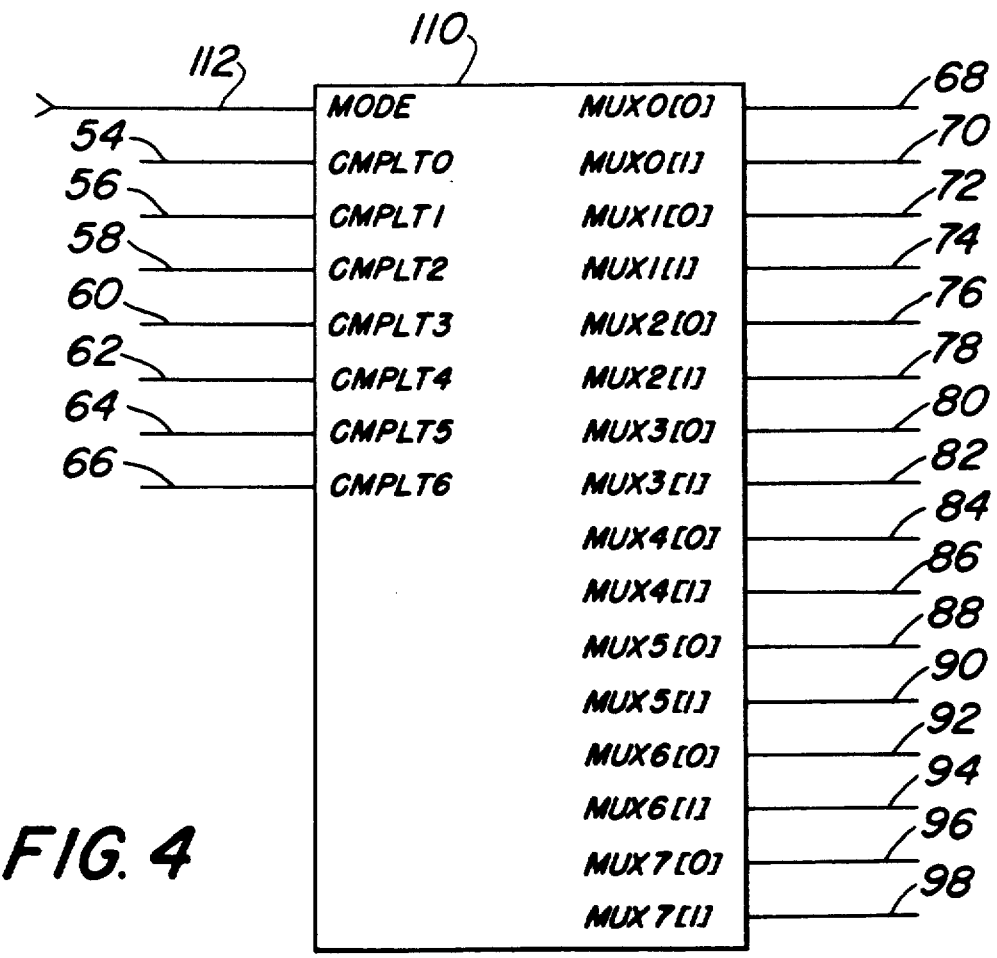
FIG. 4 is a diagram illustrating one embodiment of pin connections of a preferred controller for use in the self-sorting stack of FIG. 2.
Figure 2A:
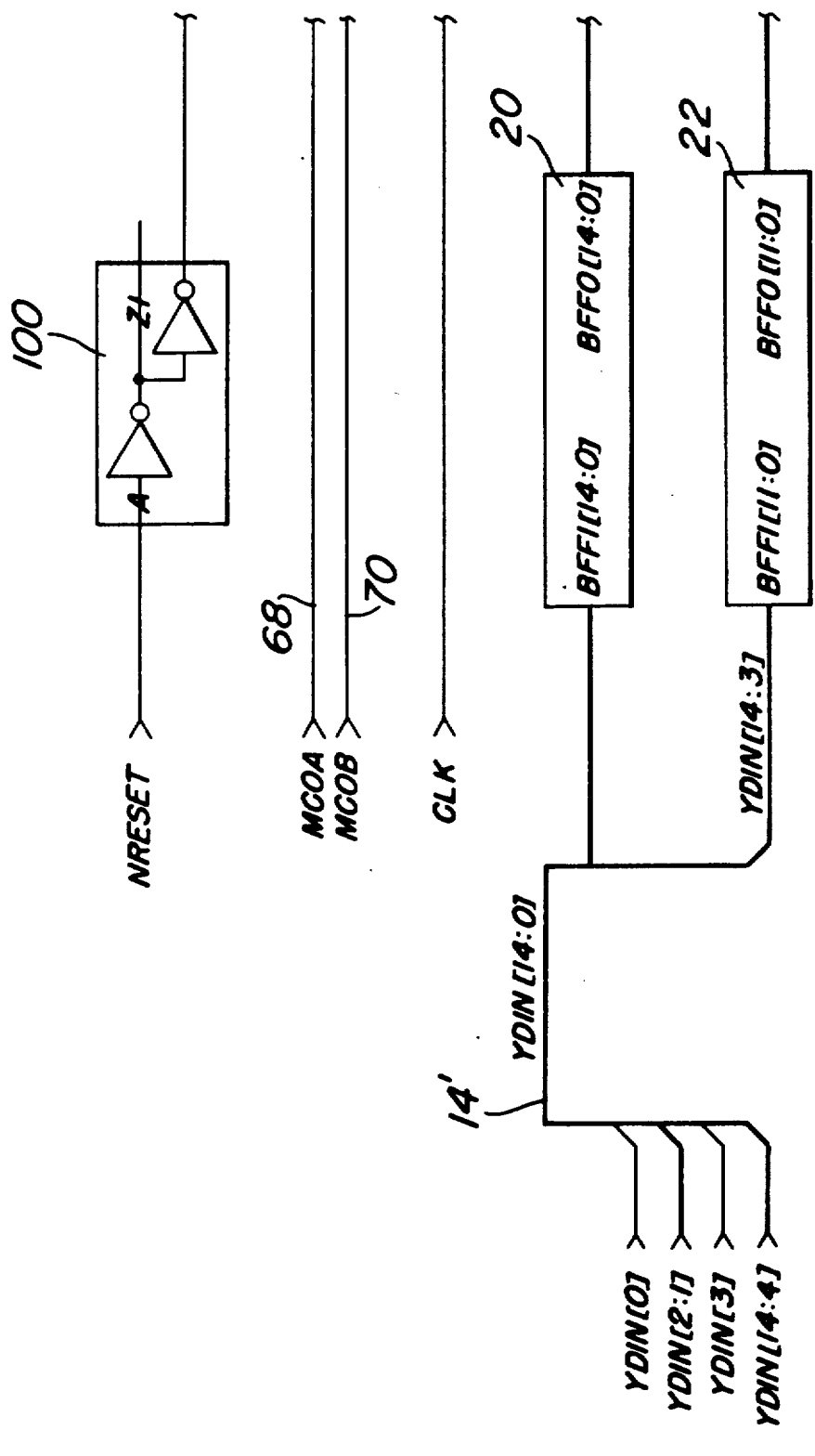
Figure 2B:
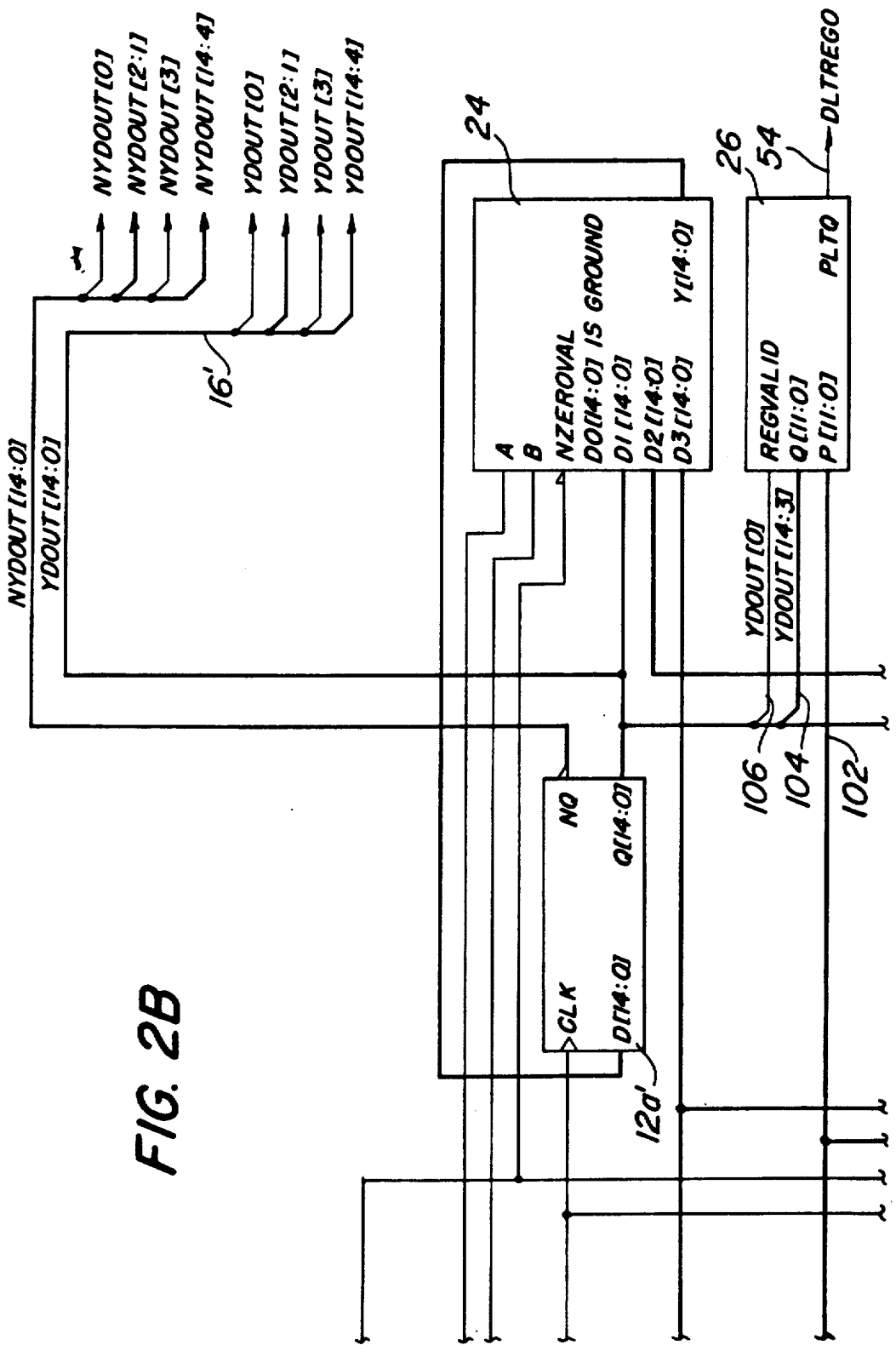
Figure 2D:
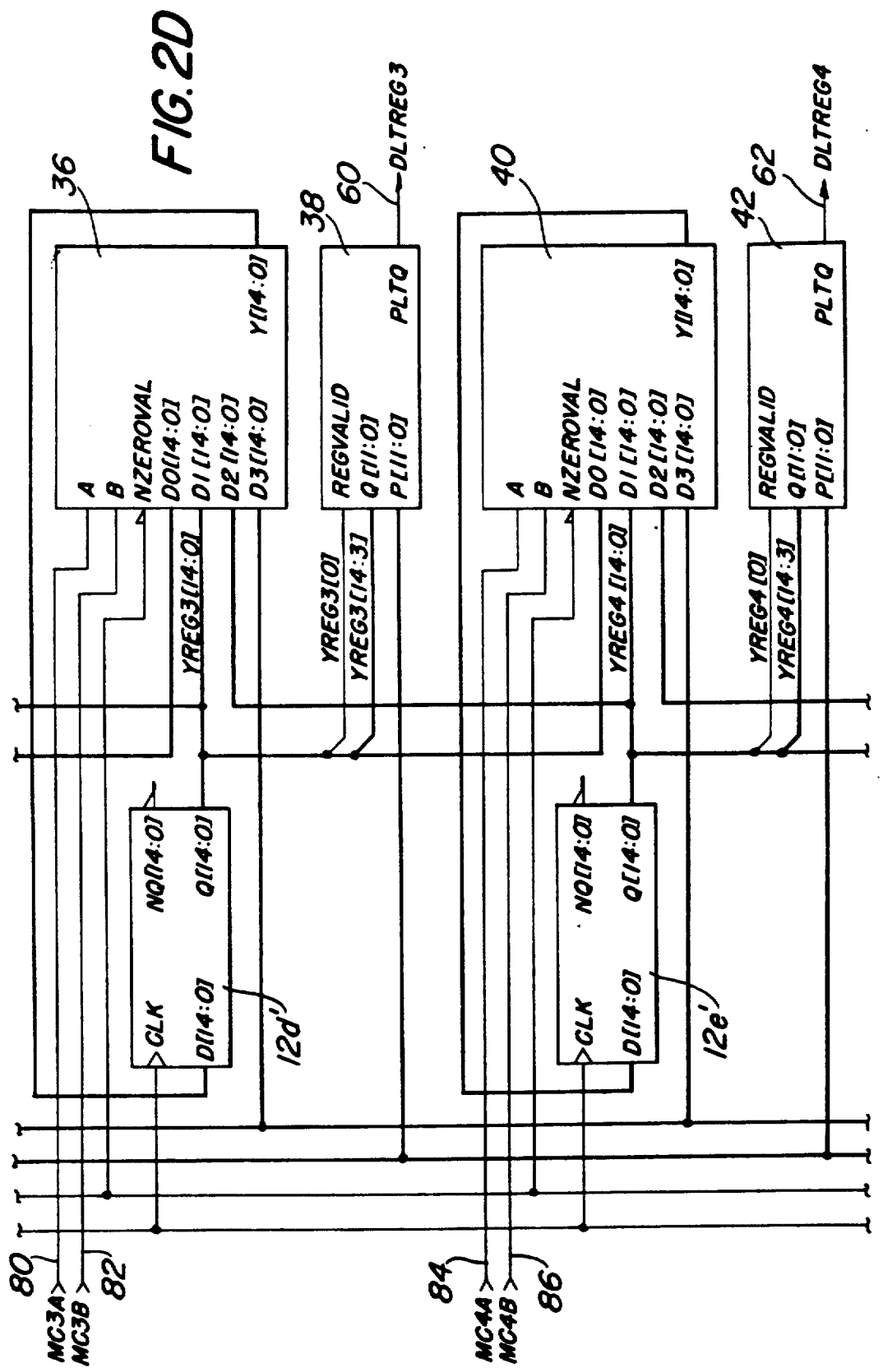
Figure 2F:
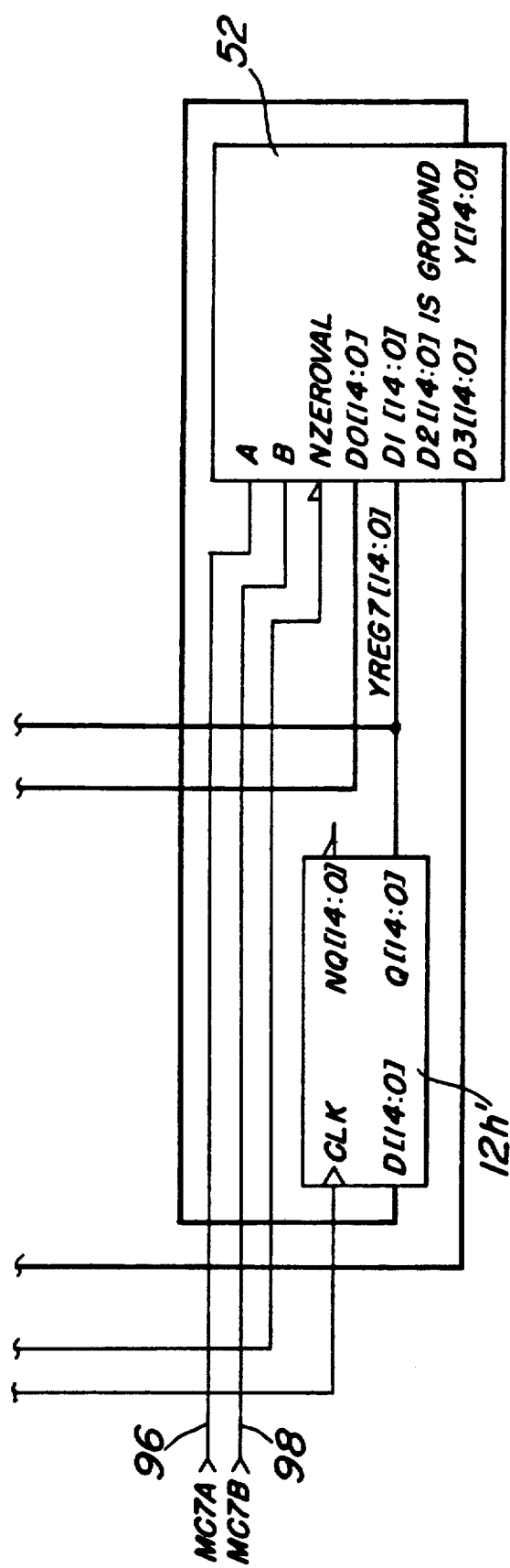
Figure 3B:
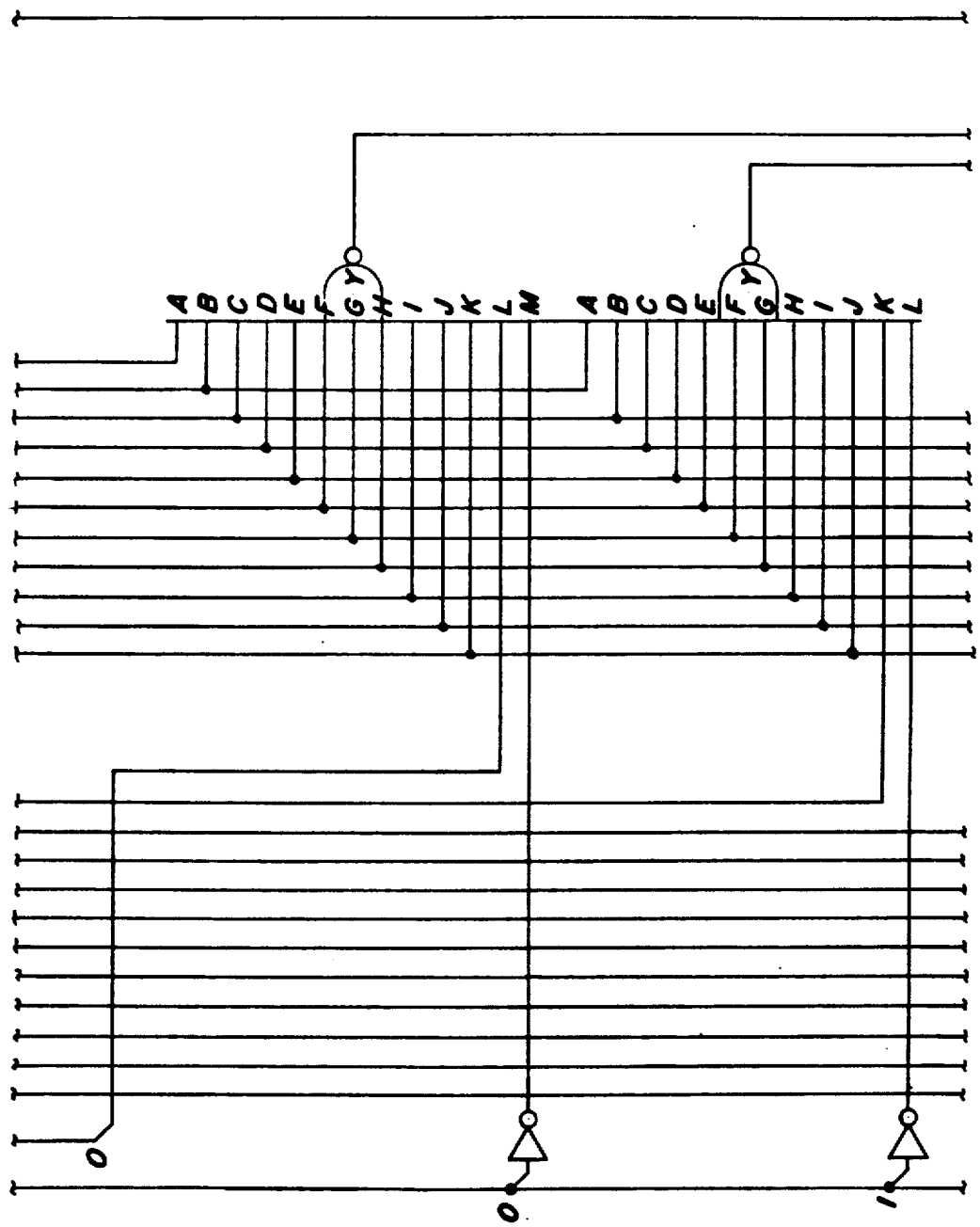
Figure 3C:
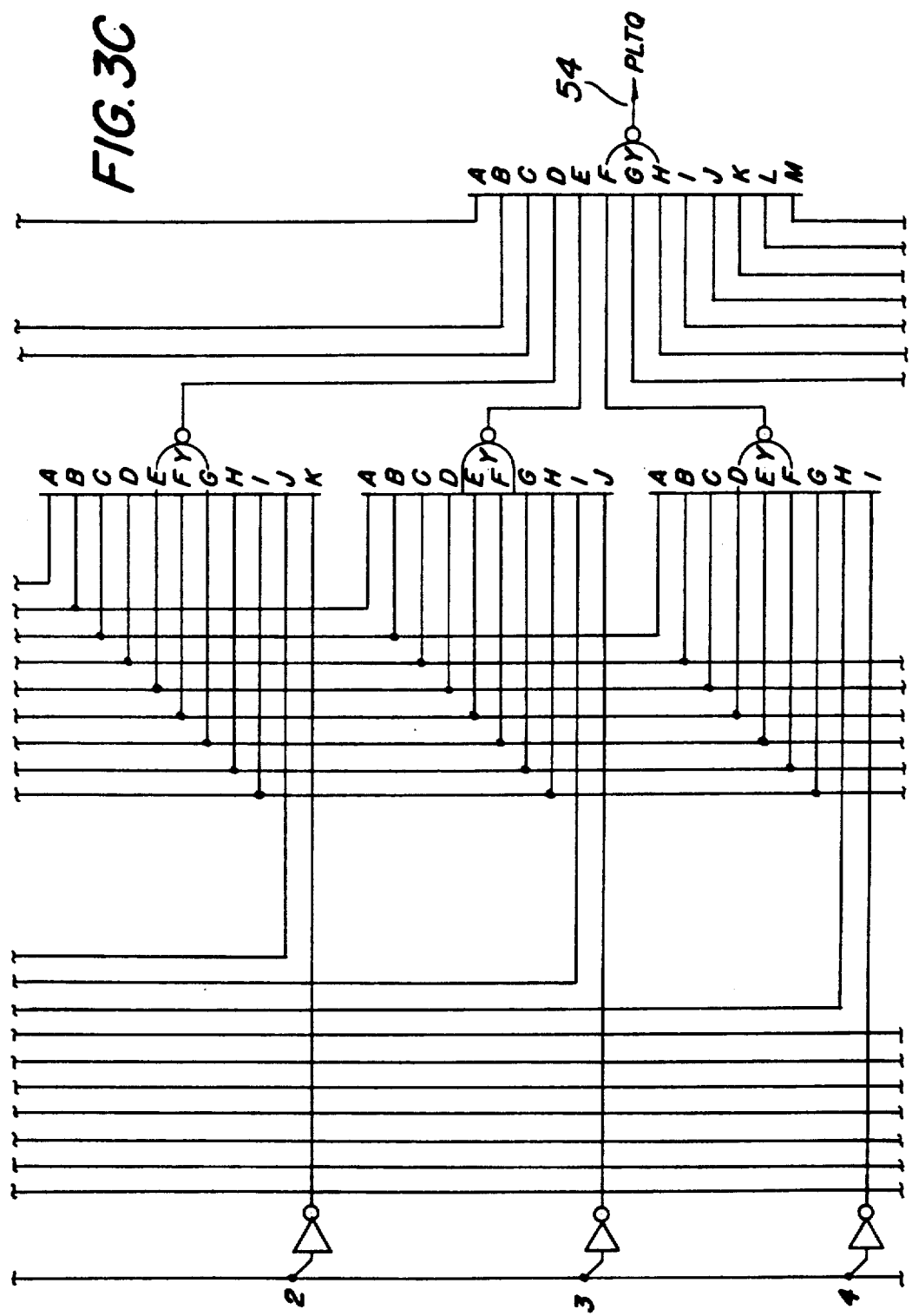
Figure 3D:
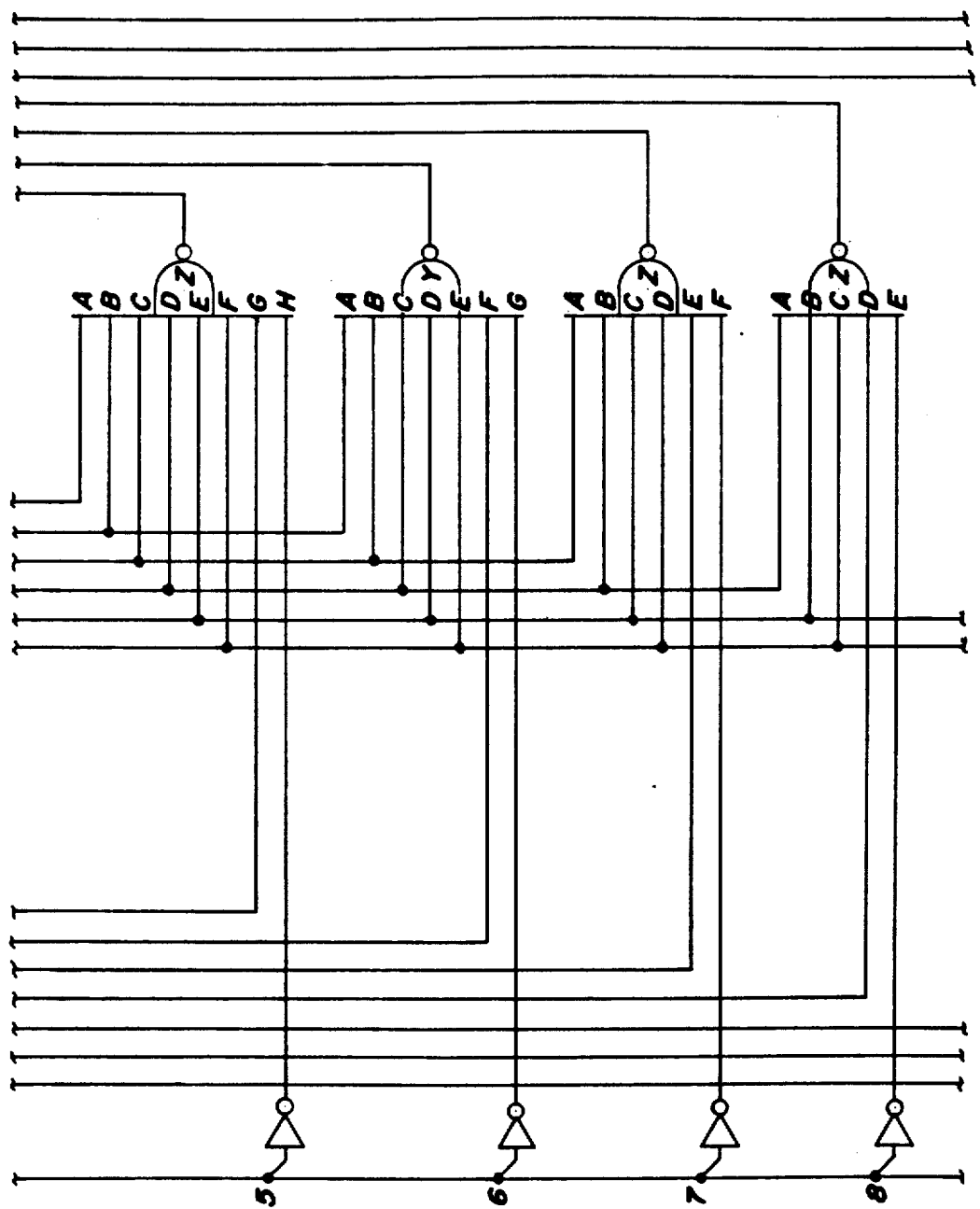
Figure 3E:
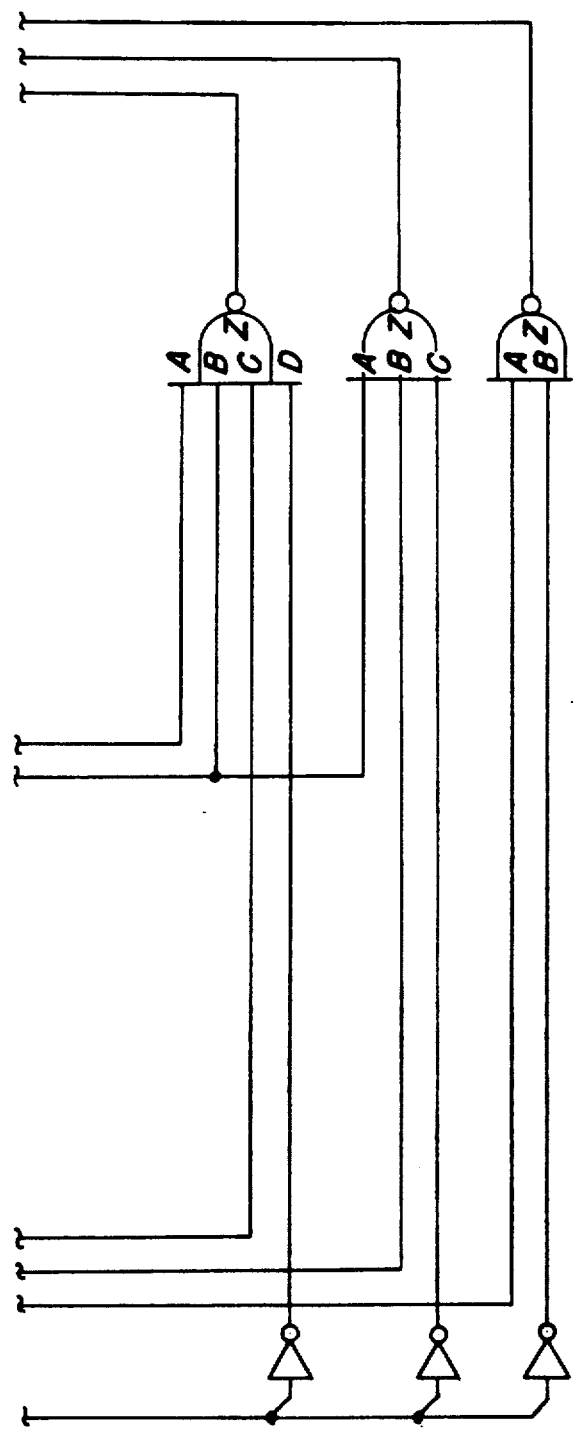

Referring now to FIG. 4, therein is depicted an illustration of one embodiment of pin connections of a preferred controller 110 for use in the self-sorting stack of FIG. 2. Inputs to the controller, designated "CMPLT0", "CMPLT1", "CMPLT2", "CMPLT3", "CMPLT4", "CMPLT5" and "CMPLT6", are provided by comparators 26, 30, 34, 38, 42, 46, 50 over lines 54, 56, 58, 60, 62, 64 and 66 respectively. The input designated "MODE" is provided over line 112 by an external source. The external source is not considered part of the invention. In the preferred embodiment, the MODE signal comprises two bits, the function of which will be discussed with reference to FIG. 5. The outputs of controller 110 are designated "MUX0[0]", "MUX0[1]", "MUX1[0]", "MUX1[1]", "MUX2[0]", "MUX2[1]", "MUX3[0]", "MUX3[1]", "MUX4[0]", "MUX4[1]", "MUX5[0]", "MUX5[1]", "MUX6[0]", and "MUX6[1]" These outputs drive the A & B inputs of the multiplexers. For example MUX0[0] is transmitted over line 68 to input A of multiplexer 24; similarly MUX0[I] is transmitted over line 70 to input B of multiplexer 24.

The controller is a combinatorial circuit. It is the responsibility of the external source using the invention to properly apply or receive data and apply the corresponding MODE before asserting a clock signal CLK (FIG. 2A) that causes the data transfer desired.

Figure 5:
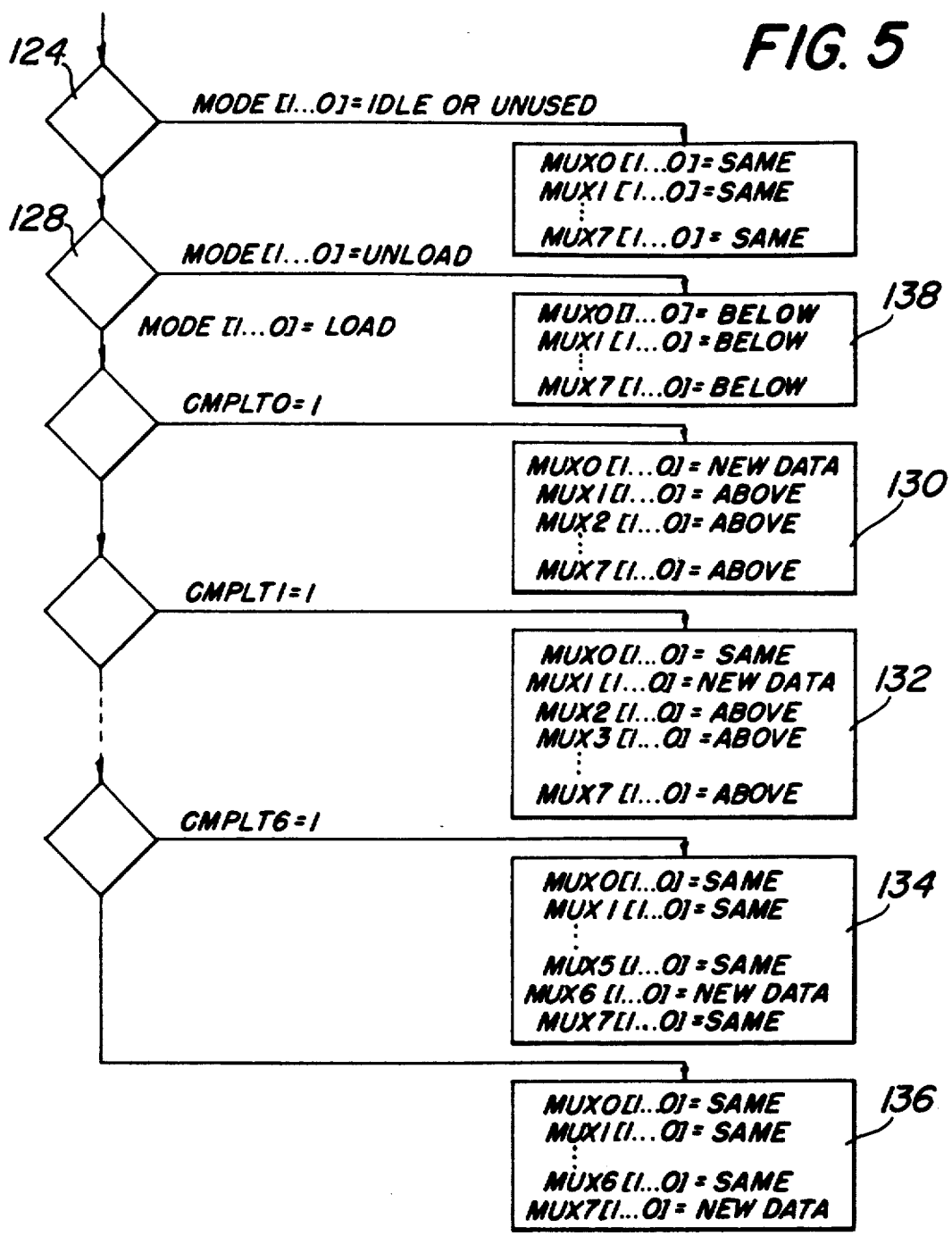
FIG. 5 is a flowchart of a preferred operation for operating the controller of FIG. 4.

Referring now to FIG. 5, therein is provided a flowchart for operating controller 110 of FIG. 4. Since, the MODE input comprises two bits, there are four possible modes of operation which may be selected by the user. As indicated at block 120, the input modes are decoded in the following manner: IDLE=0; UNUSED=1; LOAD=2; and UNLOAD=3.

If either IDLE or UNUSED is selected, the output of multiplexers 24, 28, 32 etc. to their associated registers 26, 30, 34 etc. will be derived from D1 data; i.e. each register will receive its own data, and thus remain unchanged. If LOAD is selected, the output of multiplexers 24, 28, 32 etc. to their associated registers 26, 30, 34 etc. will be either new data derived from D3, data from the register below it derived from D2, or data from the register above it derived from D0. Exactly which will depend upon the CMPLT signals, the functions of which are described below. If UNLOAD is selected, each multiplexer will provide to its associated register data from the register immediately below it, derived from D2. To achieve these results, control words "ABOVE", "SAME", "BELOW", and "NEWDATA" are encoded with the values 0, 1, 2 and 3 respectively, as shown at block 122.

MODE=IDLE, UNUSED. At block 124 a determination is made of whether MODE =IDLE or UNUSED. If so, the two bits of MUX0 (i.e., MUX0[0]and MUX0[1]), MUX1, MUX2, MUX3 etc. to MUX 7 are set to SAME, or "1", block 126. As discussed above, these outputs drive the A & B terminals of multiplexers 24, 28, 32 etc. For example, MUX0[0] and MUX0[1] drive inputs A and B, respectively, of multiplexer 24; MUX1[0] and MUX1[1] drive inputs A and B respectively of multiplexer 28; MUX2[0] and MUX2[1] drive inputs A and B of multiplexer 32; and so on.

MODE=LOAD. If the mode selected is LOAD, new data will be inserted into the stack at a location dependent upon the various outputs of comparators 26, 30, 34, 38, 42, 46 and 50. First, the CMPLT0 input of controller 110 is tested to determine whether it is "1" (or TRUE). If TRUE, this indicates that the magnitude of the incoming data is less than the magnitude of the data word stored in first register 12a'. In this case, as shown at block 130, the two bits of MUX0 are set equal to NEWDATA (i.e. "3") and the remaining outputs (MUX1, MUX2, MUX3, MUX4, MUX5, MUX6 and MUX7) are set to ABOVE (i.e. "1"). This indicates to multiplexer 24 that register 12a' will receive the incoming data word, and to multiplexers 28, 32, 36, 40, 44, 48 and 52 that their respective registers (12b' through 12h') will receive data from the immediately preceding register. In this way, each of the data words in the stack is pushed down in the stack by one register, and the new data is inserted in the first register.

If CMPLT0 is not TRUE, a determination is made as to whether CMPLT1 is TRUE, which would indicate that the magnitude of the incoming data is less than the magnitude of the data in second register 12b', but greater than or equal to the magnitude of the data in register 12a'. If CMPLT1 is TRUE, the two bits of MUX0 are set equal to SAME, the two bits of MUX1 are set equal to NEWDATA, and the remaining outputs are set equal to ABOVE, thereby causing the multiplexers to insert the incoming data word into register 12b' while leaving the contents of register 12a' unchanged, and pushing the contents of registers 12b' through 12h' down in the stack.

If CMPLT1 is not TRUE, similar steps are executed to determine where in the stack the incoming data should be located. If none of controller 110's inputs (i.e. CMPLT0-CMPLT6) are TRUE, by default the incoming data is directed to the last register in the sequence, register 12h'. This is indicated at block 136 where MUX0 through MUX6 are all set to SAME and MUX7 is set to NEWDATA.

MODE=UNLOAD. Finally, the UNLOAD procedure is represented at block 138. For an UNLOAD operation, the data word in register 12a' is removed and the contents of all subsequent registers (12b'-12h') are pushed up to the immediately preceding register in the sequence. As data is pushed up in the stack, the last register in the sequence having valid data will automatically have its valid bit set to show an empty register. Thus, as data words are sequentially unloaded, these registers will be shown as empty, making a reset between uses of the stack unnecessary.

As mentioned earlier, the controller 110 is a combinatorial circuit. The following are logic equations describing a preferred implementation of the controller 110 and correspond to the flowchart of FIG. 5.

```
MUX0[0] =
    /MODE[0]
    +/MODE[1];
MUX0[1] =
    MODE[1] * CMPLT0
    +MODE[1] * MODE[0];
MUX1[0] =
    /MODE[0] * /CMPLT0
```

```
+/MODE[1];
MUX1[1] =
    MODE[1] * /CMPLT0 * CMPLT1
    + MODE[1] * MODE [0];
MUX2[0] =
    /MODE[0] * /CMPLT0 * /CMPLT1
    +/MODE[1];
MUX2[1] =
    MODE[1] * /CMPLT0 * /CMPLT1 * CMPLT2
    + MODE[1] * MODE[0];
MUX3[0] =
    /MODE[0] * /CMPLT0 * /CMPLT1 * /CMPLT2
    +/MODE[1];
MUX3[1] =
    MODE[1] * /CMPLT0 * /CMPLT1 * /CMPLT2 * CMPLT3
    + MODE[1] * MODE[0];
MUX4[0] =
    /MODE[0] * /CMPLT0 * /CMPLT1 * /CMPLT2
        * /CMPLT3
    +/MODE[1];
MUX4[1] =
    MODE[1] * /CMPLT0 * /CMPLT1 * /CMPLT2 * /CMPLT3
        * CMPLT4
    + MODE[1] * MODE[0];
MUX5[0] =
    /MODE[0] * /CMPLT0 * /CMPLT1 * /CMPLT2
        * /CMPLT3 * /CMPLT4
    +/MODE[1];
MUX5[1] =
    MODE[1] * /CMPLT0 * /CMPLT1 * /CMPLT2 * /CMPLT3
        * /CMPLT4 * CMPLT5
    + MODE[1] * MODE[0];
MUX6[0] =
    /MODE[0]* /CMPLT0 * /CMPLT1 * /CMPLT2
        * /CMPLT3 * /CMPLT4 * /CMPLT5
    +/MODE[1];
MUX6[1] =
    MODE[1] * /CMPLT0 * /CMPLT1 * /CMPLT2 * /CMPLT3
        * /CMPLT4 * /CMPLT5 * CMPLT6
    + MODE[1] * MODE[0];
MUX7[0] =
    MODE[0] * /CMPLT0 * /CMPLT1 * /CMPLT2 * /CMPLT3
        * /CMPLT4 * /CMPLT5 * /CMPLT6
    + /MODE[1];
MUX7[1] =
    MODE[1] * /CMPLT0 * /CMPLT1 * /CMPLT2 * /CMPLT3
        * /CMPLT4 * /CMPLT5 * /CMPLT6
    + MODE[1] * MODE[0];
```

The operation of the self-sorting stack just described may be summarized as follows: The eight registers of the stack are cleared, showing that their respective entries are not valid. When a new data word is to be loaded in the stack, it is simultaneously compared to the contents of each of the eight registers. If the first word is invalid, then the data is inserted in the first register. If the first word is valid, a determination is made as to whether it is less than the incoming data. If it is, then the existing data in the stack is pushed down one register and the new data is inserted in the first register. If the new data is not less than the data in the first register, it is compared to the data in the second register using the same procedure and results, and so on, through all eight registers. The new data word will therefore only be inserted after data of lesser magnitude. All comparisons are made in one clock cycle.

The preferred embodiment is implemented with a plurality of multiplexers, registers, and associated comparators, and a single controller for controlling the multiplexers. All of this may be integrated into a single device using known integrated circuit technology.

The present invention may be embodied in any specific form without departing from the spirit or essential attributes thereof. Accordingly, reference should be made to the appended claims, rather than to the foregoing specification, as indicating the scope of the invention.

What is claimed is:

1. Apparatus for sorting and storing incoming data words according to magnitude comprising:
   a) register means for storing a sequence of data words, said register means comprising a plurality of data storage registers; and,
   b) sorting means operatively coupled to the register means for receiving incoming data words and storing the incoming data words into the register means in rank order according to magnitude, the sorting means comprising:
      (i) a plurality of comparators, each said comparator arranged to compare the magnitude of a data word stored in an associated one of said registers with the magnitude of an incoming data word and to provide an output signal indicative of the result of the comparison; and
      (ii) a plurality of multiplexers, each said multiplexer coupled to and associated with a different one of the registers, and each but a first and a last of the multiplexers further being coupled to registers both immediately preceding and immediately following the register associated with each said multiplexer, for loading the associated register with one of either incoming data word or the contents of the said preceding or following register in the sequence or the content of the associated register, depending at least upon the value of a control signal; and
   c) a controller coupled to the comparators and the multiplexers for providing the control signals to the multiplexers, said controller comprising: (i) means for receiving an externally supplied mode signal (MODE) and said output signals from said comparators, said mode signal identifying one of a first, second, third, and fourth modes of operation (IDLE, UNUSED, LOAD, UNLOAD); and (ii) means for generating said control signals to control said multiplexers as follows: (1) if MODE=IDLE or UNUSED, each said register will receive its own data and the contents of the register means will remain unchanged; (2) if MODE =LOAD, new data will be inserted into the register means at a location dependent upon the outputs of the comparators; (3) if MODE=UNLOAD, the data in a first register will be removed and the contents of all subsequent registers will be pushed to an immediately adjacent register in the register means.

2. Apparatus of claim 1 wherein the stored data words are maintained in sequential locations with data words of lesser magnitude preceding data words of greater magnitude.

3. Apparatus for sorting and storing incoming data words according to magnitude comprising:
   a) a sequence of a plurality N of registers for storing a plurality N of data words; and
   b) sorting means coupled to the registers for receiving incoming data words and storing the incoming data words into the registers in rank order according to magnitude, the sorting means comprising:
      (i) a plurality of N−1 of comparators, there being a comparator associated with all but one of the registers, for comparing the magnitude of the data words stored in the registers with the magnitude of the data word, and for providing an output signal indicative of whether the magnitude of the incoming data word is less than the magnitude of a data word stored in one of the N−1 registers; and (ii) a plurality of N multiplexers, each said multiplexer being coupled to and associated with a different one of the N registers, and each but a first and a last of the multiplexers further being coupled to registers both immediately preceding and immediately following the register associated with each said multiplexer, for loading the associated register with one of either the incoming data word or the contents of the said preceding or following register in the sequence or the contact of the associated register, depending at least upon the value of a control signal; and (iii) control means coupled to the comparators and the multiplexers for providing the control signals to the multiplexers, said control means comprising: means for receiving an externally supplied mode signal (MODE) and said output signals from said comparators, said mode signal identifying one of a first, second, third, and fourth modes of operation (IDLE, UNUSED, LOAD, UNLOAD); and means for generating said control signals to control said multiplexers as follows: (1) if MODE= IDLE or UNUSED, each said register will receive its own data and the contents of the register means will remain unchanged; (2) if MODE =LOAD, new data will be inserted into the register means at a location dependent upon the outputs of the comparators; (3) if MODE=UNLOAD, the data in a first register will be removed and the contents of all subsequent registers will be pushed to an immediately adjacent register in the register means;

whereby the stored data words are maintained in sequential registers with data words of lesser magnitude preceding data words of greater magnitude.

* * * * *